United States Patent
Bajaj et al.

(10) Patent No.: US 12,493,918 B2
(45) Date of Patent: Dec. 9, 2025

(54) SYSTEMS AND METHODS FOR DISPUTE RESOLUTION

(71) Applicant: Walmart Apollo, LLC, Bentonville, AR (US)

(72) Inventors: Rahul Bajaj, New Delhi (IN); Kailash Sati, Bangalore (IN); Luis Felipe Gonzalez Fuentes, San Francisco, CA (US); Uzma Khan, Toronto (CA); Punith Kumar, Bangalore (IN); Karuna Rawat, Lucknow (IN)

(73) Assignee: Walmart Apollo, LLC, Bentonville, AR (US)

( * ) Notice: Subject to any disclaimer, the term of this patent is extended or adjusted under 35 U.S.C. 154(b) by 797 days.

(21) Appl. No.: 17/581,539

(22) Filed: Jan. 21, 2022

(65) Prior Publication Data

US 2023/0237602 A1    Jul. 27, 2023

(51) Int. Cl.
*G06N 20/00* (2019.01)
*G06F 40/20* (2020.01)
(Continued)

(52) U.S. Cl.
CPC .......... *G06Q 50/182* (2013.01); *G06F 40/20* (2020.01); *G06N 20/00* (2019.01); *G06Q 30/016* (2013.01); *G06Q 30/0609* (2013.01)

(58) Field of Classification Search
CPC .. G06Q 30/01; G06Q 30/0631; G06Q 30/016; G06Q 10/20; G06Q 10/06375
See application file for complete search history.

(56) References Cited

U.S. PATENT DOCUMENTS

| 7,630,904 B2 | 12/2009 | Vaidyanathan et al. |
| 11,017,180 B2 | 5/2021 | Gandhi et al. |

(Continued)

FOREIGN PATENT DOCUMENTS

| CN | 111488503 | 8/2020 |
| IN | 202011017319 | 1/2021 |

OTHER PUBLICATIONS

Kapočiūtė-Dzikienė, J. (2020). A domain-specific generative chatbot trained from little data. Applied Sciences, 10(7), 2221 (Year: 2020).*

(Continued)

*Primary Examiner* — Maria C Santos-Diaz
(74) *Attorney, Agent, or Firm* — DICKINSON WRIGHT RLLP; Hector A. Agdeppa

(57) ABSTRACT

Systems and methods including one or more processors and one or more non-transitory computer readable media storing computing instructions that, when executed on the one or more processors, perform: receiving dispute resolution information from a user corresponding to a dispute, wherein the dispute resolution information comprises a first data input and a second data input; analyzing, with a first machine learning module in a first tier of a machine learning engine, the dispute resolution information from the user to identify a dispute reason; analyzing, with at least one of second and third machine learning modules in a second tier of the machine learning engine, the dispute resolution information based on the dispute reason, as identified; and determining a dispute resolution based on an output of the second tier of the machine learning engine to resolve the dispute. Other embodiments are disclosed herein.

20 Claims, 8 Drawing Sheets

Multi Stage Models Architecture

(51) Int. Cl.
    *G06Q 30/016*      (2023.01)
    *G06Q 30/0601*     (2023.01)
    *G06Q 50/18*       (2012.01)

(56) References Cited

U.S. PATENT DOCUMENTS

| | | | | |
|---|---|---|---|---|
| 11,720,903 | B1* | 8/2023 | Henryson | G06F 16/285 |
| | | | | 706/11 |
| 12,008,459 | B2* | 6/2024 | Chen | G06N 3/047 |
| 2006/0031177 | A1 | 2/2006 | Rule | |
| 2019/0220695 | A1* | 7/2019 | Nefedov | G06F 16/285 |
| 2019/0392538 | A1 | 12/2019 | So et al. | |
| 2021/0133581 | A1* | 5/2021 | Podgorny | G06F 40/35 |
| 2021/0264438 | A1* | 8/2021 | Singh | G06Q 30/016 |
| 2021/0266407 | A1* | 8/2021 | Burton | G06Q 30/016 |
| 2021/0303793 | A1* | 9/2021 | Wang | G06F 40/166 |
| 2021/0304747 | A1* | 9/2021 | Haas | G06Q 30/016 |
| 2022/0044111 | A1* | 2/2022 | Singh | G06F 40/30 |
| 2022/0094789 | A1* | 3/2022 | Lau | G10L 15/26 |
| 2023/0154455 | A1* | 5/2023 | Vu | G10L 15/1815 |
| | | | | 704/243 |
| 2023/0169516 | A1* | 6/2023 | Rapp | G06F 40/56 |
| | | | | 704/9 |
| 2023/0222511 | A1* | 7/2023 | Baghdasaryan | G06Q 30/016 |
| | | | | 706/12 |
| 2025/0037862 | A1* | 1/2025 | Harper | G16H 40/60 |

OTHER PUBLICATIONS

Eugene Steinberg, Tiered machine learned ranking improves relevance for the retail search, Mar. 3, 2020, Grid Dynamics "https://www.griddynamics.com/blog/tiered-machine-learning-ranking-improves-relevance" (Year: 2020).*

David Tsurel, E-Commerce Dispute Resolution Prediction, Oct. 13, 2021, arXiv:2110.15730, (Year: 2021).*

* cited by examiner

| Reason Code | Tier 1 Reason | Tier 2 Reason |
|---|---|---|
| DISPUTE_REASON_1_2 | I did not receive this return | I received an empty box |
| DISPUTE_REASON_1_3 | I did not receive this return | Return package was not delivered to me |
| DISPUTE_REASON_1_1 | I did not receive this return | This item was missing from the return |
| DISPUTE_REASON_2 | Return is different from the original item | |
| DISPUTE_REASON_4 | Item is in unsellable condition | Item has missing parts or accessories |
| DISPUTE_REASON_3_1 | Item is in unsellable condition | Item was used or damaged |
| DISPUTE_REASON_3_2 | Item is in unsellable condition | Original packaging is missing or damaged |
| DISPUTE_REASON_8 | Item was returned outside the return window | |
| DISPUTE_REASON_6 | I was charged incorrect customer refund | |
| DISPUTE_REASON_OTHERS | Something not listed | |
| DISPUTE_REASON_5 | Customer used an incorrect return reason | |
| DISPUTE_REASON_7 | I sent the customer a replacement | |
| DISPUTE_REASON_9 | Item delivered to customer | |

FIG. 6

SYSTEMS AND METHODS FOR DISPUTE RESOLUTION

TECHNICAL FIELD

This disclosure relates generally to computing system management, and more particularly to systems and methods for dispute resolution.

BACKGROUND

Users in an online marketplace typically comprise buyers and sellers. The sellers offer items for sale that the buyers can purchase, and a back-end computing system operates as an interface between the buyers and the sellers. In some embodiments, a dispute may arise between a buyer and a seller that needs to be resolved. In some embodiments, the back-end computing system is not able to properly resolve the dispute, or resolves the dispute incorrectly which results in more issues to resolve.

BRIEF DESCRIPTION OF THE DRAWINGS

To facilitate further description of the embodiments, the following drawings are provided in which:

FIG. 6 illustrates an exemplary table including reason codes, according to certain embodiments;

Figure 1:
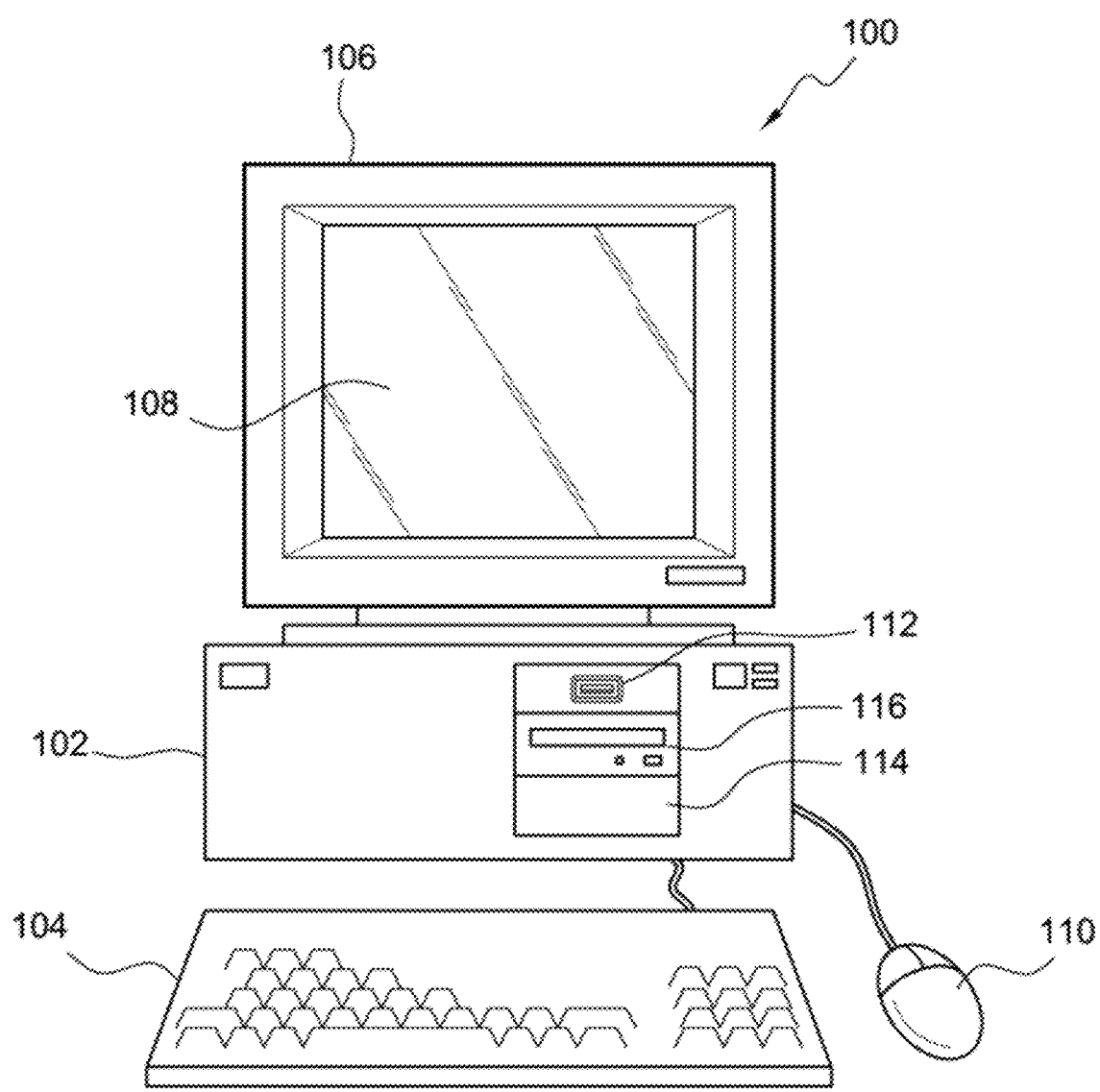
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
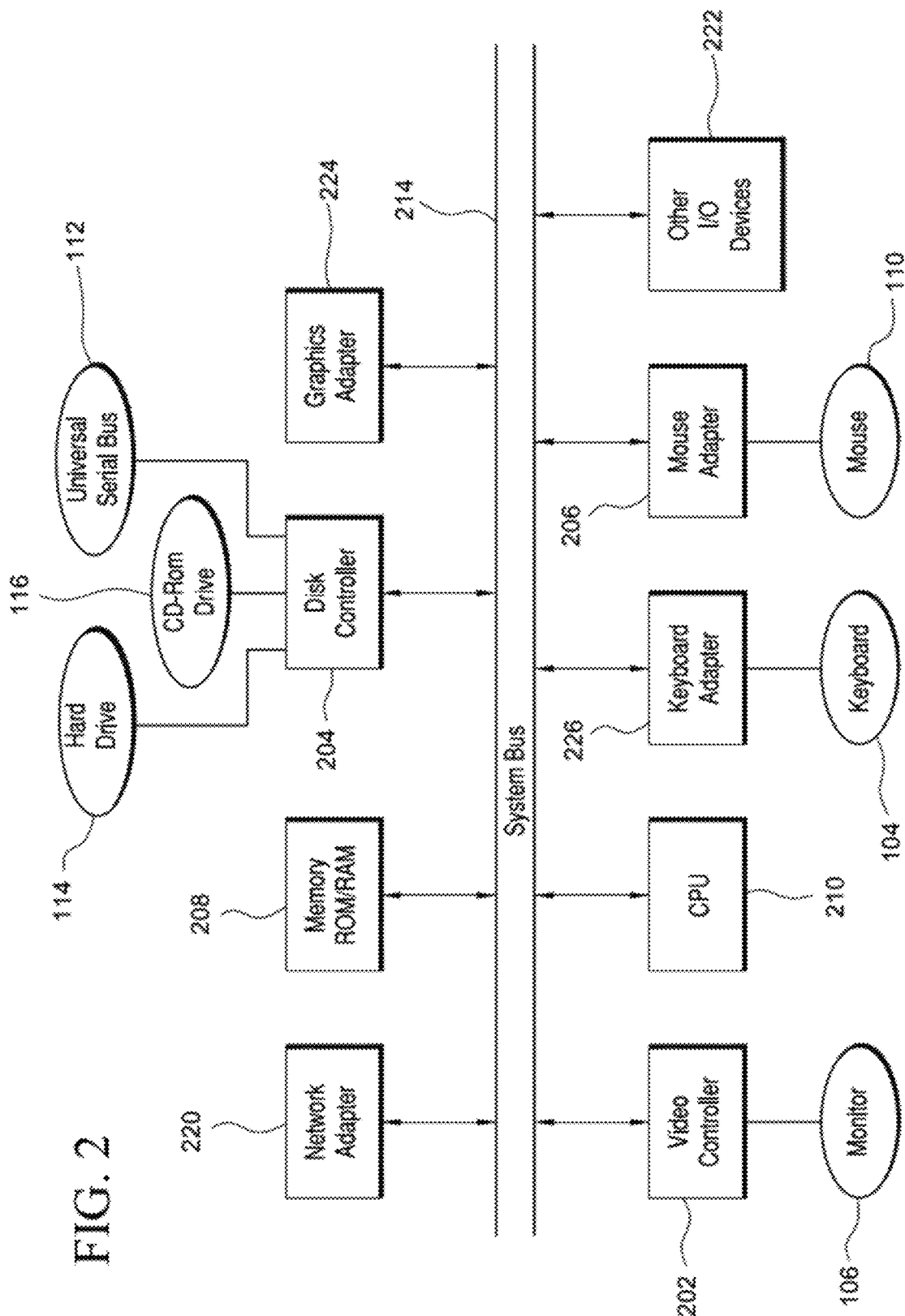
FIG. 2 illustrates a representative block diagram of an example of the elements included in the circuit boards inside a chassis of the computer system of FIG. 1.

A number of embodiments can include a system. The system can include one or more processors and one or more non-transitory computer-readable storage devices storing computing instructions. The computing instructions can be configured to run on the one or more processors and perform: receiving dispute resolution information from a user corresponding to a dispute, wherein the dispute resolution information comprises a first data input and a second data input; analyzing, with a first machine learning module in a first tier of a machine learning engine, the dispute resolution information from the user to identify a dispute reason; analyzing, with at least one of second and third machine learning modules in a second tier of the machine learning engine, the dispute resolution information based on the dispute reason, as identified; and determining a dispute resolution based on an output of the second tier of the machine learning engine to resolve the dispute Various embodiments include a method. The method can be implemented via execution of computing instructions configured to run at one or more processors and configured to be stored at non-transitory computer-readable media. The method can comprise receiving dispute resolution information from a user corresponding to a dispute, wherein the dispute resolution information comprises a first data input and a second data input; analyzing, with a first machine learning module in a first tier of a machine learning engine, the dispute resolution information from the user to identify a dispute reason; analyzing, with at least one of second and third machine learning modules in a second tier of the machine learning engine, the dispute resolution information based on the dispute reason, as identified; and determining a dispute resolution based on an output of the second tier of the machine learning engine to resolve the dispute Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module (s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
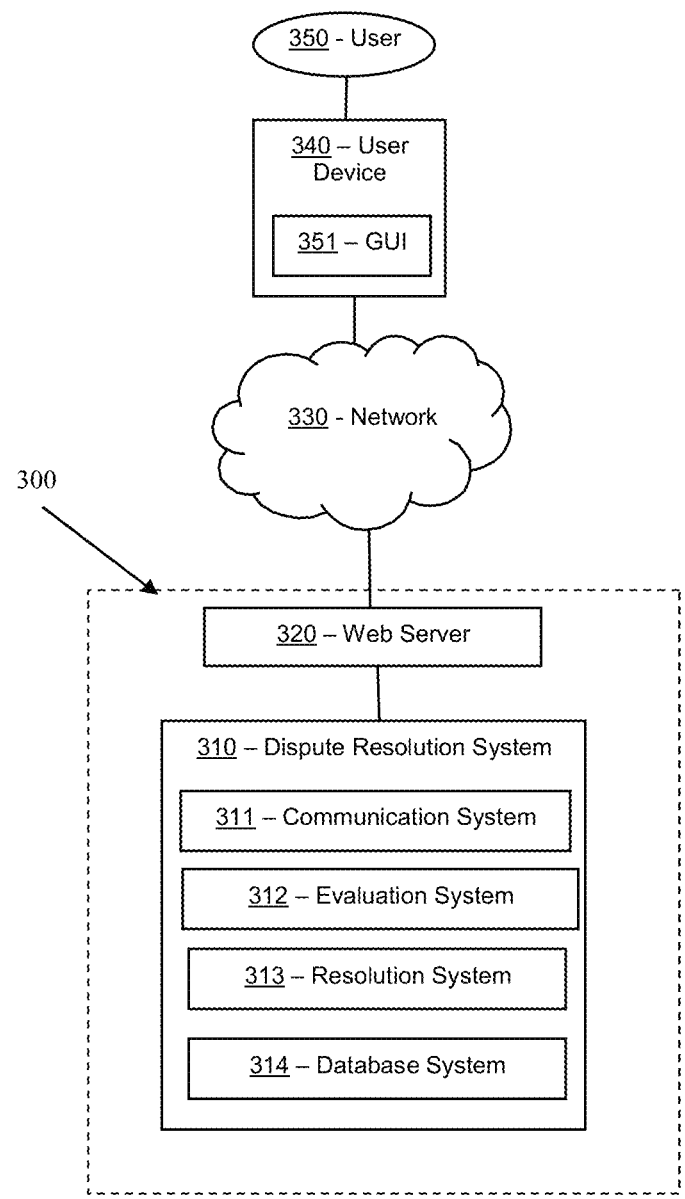
FIG. 3 illustrates a representative block diagram of a system, according to an embodiment.

Turning ahead in the drawings, FIG. 3 illustrates a block diagram of a system 300 that can be employed for determining and analyzing infrastructure components for dispute resolution, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a dispute resolution system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Dispute resolution system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host dispute resolution system 310 and/or web server 320. Additional details regarding dispute resolution system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a web site, or provide a server that interfaces with an application (e.g., a mobile application), on user device 340, which can allow users (e.g., 350) to interact with infrastructure components in an IT environment, in addition to other suitable activities. In a number of embodiments, web server 320 can interface with dispute resolution system 310 when a user (e.g., 350) is viewing infrastructure components in order to assist with the analysis of the infrastructure components.

In some embodiments, an internal network that is not open to the public can be used for communications between dispute resolution system 310 and web server 320 within system 300. Accordingly, in some embodiments, dispute resolution system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, dispute resolution system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to dispute resolution system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of dispute resolution system 310 and/or web server 320. In a similar manner, the processors and/or the non-transitory computer-readable media can be local and/or remote to each other.

Meanwhile, in many embodiments, dispute resolution system 310 and/or web server 320 also can be configured to communicate with one or more databases, such as a database system 315. The one or more databases can include verified dispute resolutions, dispute resolution information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, dispute resolution system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, dispute resolution system 310 can include a communication system 311, an evaluation system 312, a resolution system 313, and/or database system 314. In many embodiments, the systems of dispute resolution system 310 can be modules of computing instructions (e.g., software modules) stored at non-transitory computer readable media that operate on one or more processors. In other embodiments, the systems of dispute resolution system 310 can be implemented in hardware. Dispute resolution system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host dispute resolution system 310 and/or web server 320. Additional details regarding dispute resolution system 310 and the components thereof are described herein.

In many embodiments, system 300 can comprise graphical user interface ("GUI") 351. In the same or different embodiments, GUI 351 can be part of and/or displayed by user computer 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user computers 340. In the same or different embodiments, GUI 351 can comprise a website accessed through internet 320. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through Network (e.g., Internet) 330 with user computers (e.g., 340). In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, dispute resolution system 310, and/or web server 320 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of dispute resolution system 310, and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of dispute resolution system 310, and/or web server 320. In a similar manner, the processing module(s) and the memory storage module(s) can be local and/or remote to each other.

In many embodiments, dispute resolution system 310, and/or web server 320 can be configured to communicate with one or more user computers 340. In some embodiments, user computers 340 also can be referred to as customer computers. In some embodiments, dispute resolution system 310, and/or web server 320 can communicate or interface (e.g., interact) with one or more customer computers (such as user computers 340) through a network or internet 330. Internet 330 can be an intranet that is not open to the public. In further embodiments, Internet 330 can be a mesh network of individual systems. Accordingly, in many embodiments, dispute resolution system 310, and/or web server 320 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

In many embodiments, the techniques described herein can provide a practical application and several technological improvements. In some embodiments, the techniques described herein can provide for the operation of resolving a dispute using one or more tiers of a machine learning engine to mitigate use of the machine learning engine as a whole. These techniques described herein can provide a significant improvement over conventional approaches of dispute resolution. In many embodiments, the techniques described herein can beneficially make determinations of dispute resolutions without requiring updating the entire machine learning engine. That is, the machine learning engine is tiered and only certain tiers are updated as needed to conserve computing resources. In this way, the techniques described herein can avoid problems with stale and/or outdated machine learned models by continually updating tiers on an individual level without requiring an entire system update.

In many embodiments, the techniques described herein can be used continuously at a scale that cannot be reasonably performed using manual techniques or the human mind. For example, processing millions of disputes within milliseconds cannot be feasibly completed by a human In a number of embodiments, the techniques described herein can solve a technical problem that arises only within the realm of computer networks, as online disputes do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the machine learning model cannot be performed without a computer system and/or network.

Figure 4:
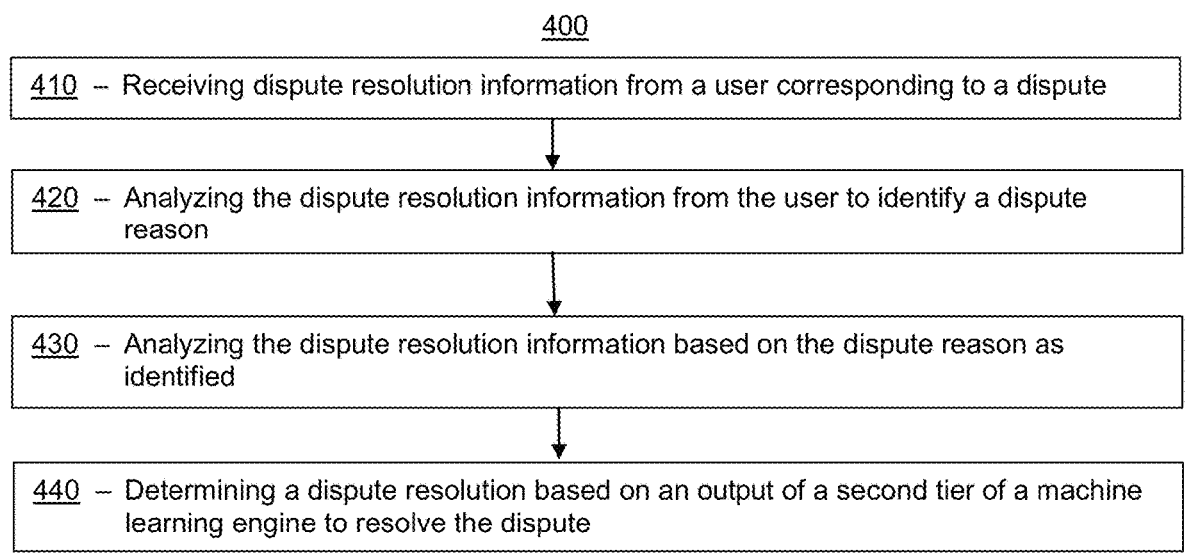
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as dispute resolution system 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving dispute resolution information from a user corresponding to a dispute. In some embodiments, the dispute resolution information comprises a first data input and a second data input. In some embodiments, the first data input corresponds to a dispute reason code selected by a user from a predefined list of dispute reason codes, and the second data input corresponds to a natural language text description input by the user. In some embodiments, the predefined list of dispute reason codes are selected from a drop-down menu. In some embodiments, the predefined dispute reason codes may not include a dispute reason that reflects a dispute of the seller. In some embodiments, the seller may select a dispute reason code from the drop-down menu, but include a natural language text description that is different than the selected dispute reason code. In such an embodiment, prior systems would be unable to process the dispute resolution information and would require manual review.

In many embodiments, method 400 additionally can comprise an activity 420 of analyzing the dispute resolution information from the user to identify a dispute reason. In some embodiments, activity 420 can comprise analyzing, with a first machine learning module in a first tier of a machine learning engine, the dispute resolution information from the user to identify a dispute reason. In some embodiments, the first tier of the machine learning engine analyzes the dispute resolution information to identify one or more tier one dispute reasons.

Figure 5:
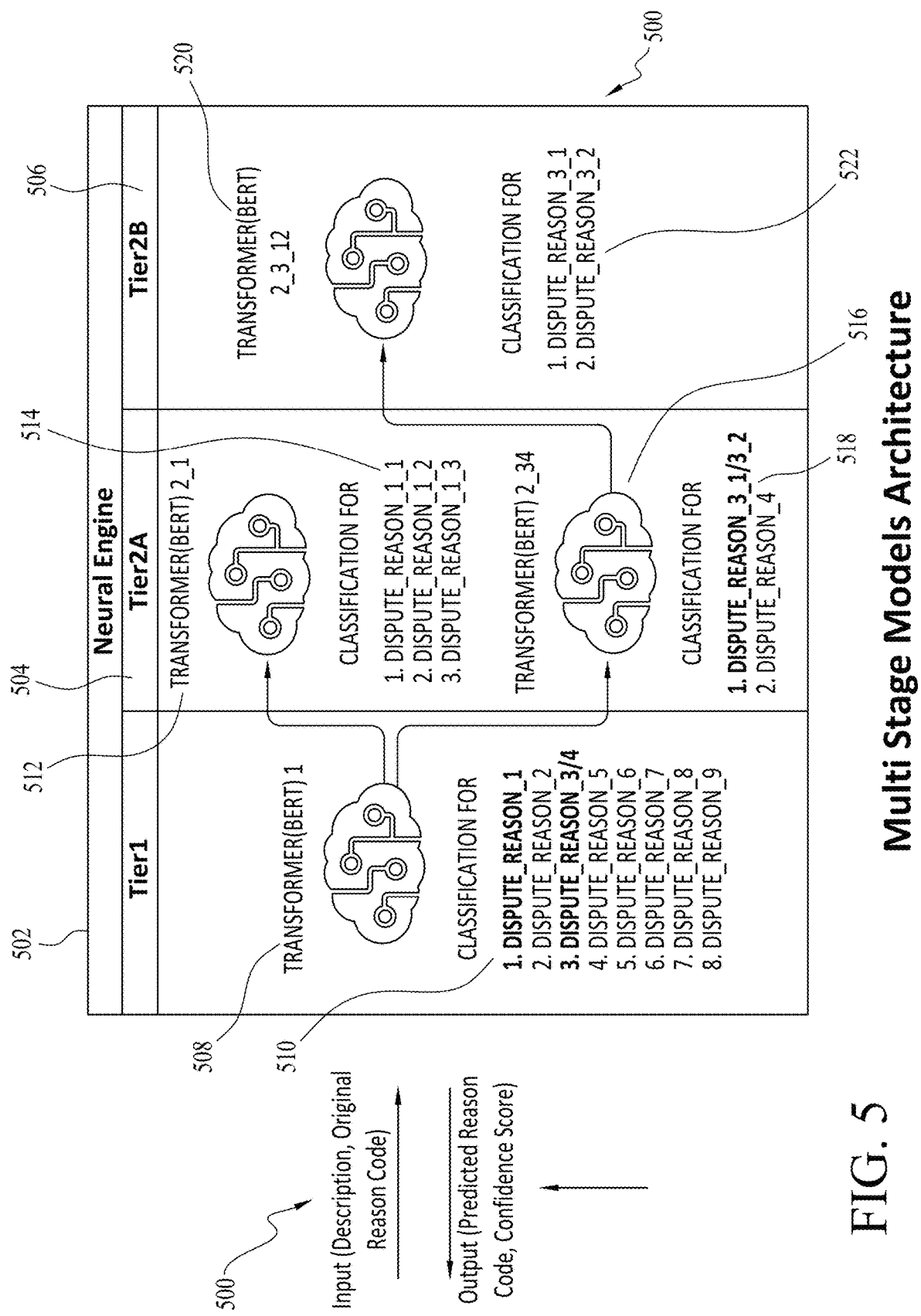
FIG. 5 illustrates an exemplary machine learning engine according to certain embodiments.

Turning briefly to FIG. 5, a machine learning engine 500 is illustrated according to certain embodiments. In the illustrated embodiment of FIG. 5, the machine learning engine 500 comprises a first tier 502, a second tier 504, and a third tier 506. In some embodiments, the first tier 502 comprises a first machine learning module 508 that is trained to analyze a first level of dispute reasons 510. In some embodiments, the second tier 504 comprises a second machine learning module 512 that is trained to analyze a second level of a first portion of the first level of dispute reasons 514. In some embodiments, the second tier 504 comprises a third machine learning module 516 that is trained to analyze a second level of a second portion of the first level of dispute reasons 518. In some embodiments, the third tier 506 comprises a fourth machine learning module 520 that is trained to analyze a third level of a portion of the first level of dispute reasons 522.

Turning briefly to FIG. 6, a table 600 illustrates different reason codes and their tiers. In the illustrated embodiment, the table includes reason codes 602, tier 1 reasons 604, and tier 2 reasons 606. In some embodiments, the first machine learning module 508 (FIG. 5) is trained to analyze the first level of dispute reasons 510 (FIG. 5). In some embodiments, the first level of dispute reasons 510 (FIG. 5) correspond to the tier 1 reasons 604. In some embodiments, the dispute resolution information is analyzed by the first machine learning module 508 (FIG. 5). In some embodiments, the second machine learning module 512 (FIG. 5) is trained to analyze the second level of the first portion of the first level of dispute reasons 514 (FIG. 5). In some embodiments, the second level of the first portion of the first level of dispute reasons 514 (FIG. 5) correspond to a portion of the tier 2 reasons 606. In some embodiments, the second level of the first portion of the first level of dispute reasons 514 (FIG. 5) correspond to "DISPUTE_REASON_1_1", "DISPUTE_REASON_1_2", and "DISPUTE_REASON_1_3" in FIG. 6. In some embodiments, the third machine learning module 516 (FIG. 5) is trained to analyze the second level of the second portion of the first level of dispute reasons 518 (FIG. 5). In some embodiments, the second level of the second portion of the first level of dispute reasons 518 (FIG. 5) correspond to a portion of the tier 2 reasons 606. In some embodiments, the second level of the second portion of the first level of dispute reasons 518 (FIG. 5) correspond to "DISPUTE_REASON_3_1", "DISPUTE_REASON_3_2", and "DISPUTE_REASON_4" In FIG. 6. In some embodiments, the fourth machine learning module 520 (FIG. 5) is trained to analyze the third level of the portion of the first level of dispute reasons 522 (FIG. 5). In some embodiments, the third level of the portion of the first level of dispute reasons 522 (FIG. 5) correspond to a portion of the tier 2 reasons 606. In some embodiments, the third level of the portion of the first level of dispute reasons 522 (FIG. 5) correspond to "DISPUTE_REASON_3_1," and "DISPUTE_REASON_3_2."

Returning to FIG. 5, in some embodiments, the first machine learning module 508 is a Bidirectional Encoder Representations from Transformers (BERT) transformer. In some embodiments, the first machine learning module 508 is a modified BERT transformer.

Figure 7:
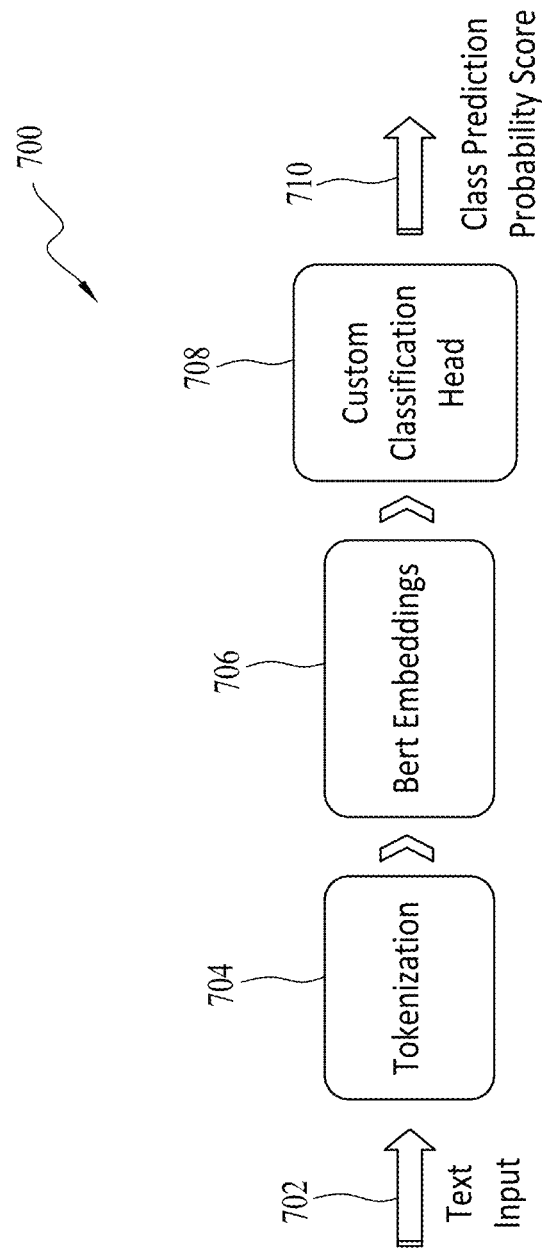
FIG. 7 illustrates an exemplary machine learning module, according to certain embodiments.

Turning briefly to FIG. 7, a modified BERT transformer 700 is illustrated. In the illustrated embodiment, the modified BERT transformer 700 includes text input 702, tokenization 704, BERT embeddings 706, classification head 708, and class prediction probability score 710.

In some embodiments, the text input 702 comprises receiving the dispute resolution information. In some embodiments, receiving the dispute resolution information includes receiving the first data input corresponding to a dispute reason code selected by a user from a predefined list of dispute reason codes, and the second data input corresponding to a natural language text description input by the user.

In some embodiments, the tokenization 704 comprises tokenizing the second data input of the dispute resolution information into one or more tokens. In some embodiments, the tokens correspond to a portion of the second data input. In some embodiments, tokenizing comprises i) taking the natural language text description input by the user, ii) separating the natural language text description into words or sub words, iii) converting the separated words or sub words into identifiers, and iv) populating a look-up table with the separated words or sub words and their corresponding identifiers. In some embodiments, tokenization is performed by transforming the natural language text description with at least one or the following: Byte-Pair Encoding (BPE), WordPiece, or SentencePiece.

In some embodiments, BERT embeddings 706 comprises determining one or more embeddings for the one or more tokens. In some embodiments, BERT embedding 706 comprises passing each of the tokens (e.g., separated words from the natural language text description) from the tokenization 704 through an embedding layer so that each token is transformed into a vector representation. In some embodiments, BERT embeddings 706 comprises 12 layers of transformer encoders, where each output per token from each layer is utilized as a word embedding.

In some embodiments, the classification head 708 comprises a pooling layer and a dropout layer that are subsequent to determining the one or more embeddings in the BERT embeddings 706. In some embodiments, the pooling layer comprises max and mean pooling.

In some embodiments, the class prediction probability score 710 comprises determining a dispute reason code and a corresponding probability for the reason code. In some embodiments, the user may select "DISPUTE_REASON_1_1" (FIG. 6) for the first data point and input a natural language text description of "item is damaged" for the second data point. In some embodiments, the modified BERT transformer 700 may operate as detailed above an output a class prediction probability score 710 that is 98.7% confident that the reason code should be "DISPUTE_REASON_3_1" (FIG. 6). In some embodiments, the class prediction probability score 710 is an output 524 (FIG. 5) of the machine learning engine 500 (FIG. 5).

Returning to FIG. 4, in many embodiments, method 400 can additionally comprise activity 430 of analyzing the dispute resolution information based on the dispute reason as identified. In some embodiments, activity 430 can comprise analyzing, with at least one of the second machine learning module 512 (FIG. 5) and the third machine learning module 516 (FIG. 5) in the second tier 504 (FIG. 5) of the machine learning engine 500 (FIG. 5), the dispute resolution information based on the dispute reason, as identified by the first machine learning module 508 (FIG. 5). In some embodiments, the first machine learning module 508 (FIG. 5) may analyze the dispute resolution information and determine that there is a high probability that the dispute resolution information corresponds to "DISPUTE_REASON_1_2" (FIG. 6). In some embodiments, the second machine learning module 512 (FIG. 5) may analyze the dispute resolution information and output a class prediction probability score (e.g., class prediction probability score 710), as detailed above in connection with FIG. 7. In some embodiments, wherein analyzing, with at least one of the second machine learning module 512 (FIG. 5) and the third machine learning module 516 (FIG. 5) in the second tier 504 (FIG. 5) of the machine learning engine 500, the dispute resolution information further comprises analyzing, with the second machine learning module 512 (FIG. 5) and not the third machine learning module 516 (FIG. 5), the dispute resolution information based on the dispute reason, as identified. In some embodiments, analyzing with just the second machine learning module 512 (FIG. 5) conserves computing resources.

Back in FIG. 4, in some embodiments, method 400 can additionally comprise activity 440 of determining a dispute resolution based on an output of a second tier of a machine learning engine to resolve the dispute. In some embodiments, the second machine learning module 512 (FIG. 5) may analyze the dispute resolution information and output a class prediction probability score (e.g., class prediction probability score 710 (FIG. 7)). In some embodiments, the class prediction probability score is utilized to determine the dispute resolution. In some embodiments, a class prediction probability score 710 (FIG. 7) that is 98.7% confident that the reason code should be "DISPUTE_REASON_3_1" (FIG. 6) may result in the user (e.g., the seller) being compensated for the refund that was issued to the buyer. In some embodiments, each of the reason codes (e.g., reason codes 602 (FIG. 6)) can be associated with one or more dispute resolutions that can be executed without manual review. In some embodiments, an output of the machine learning engine is a predicted dispute reason code and a confidence score. In some embodiments, the predicted dispute reason code is used to replace the dispute reason code selected by the user. In some embodiments, determining the dispute resolution comprises replacing the dispute reason code selected by the user with the predicted dispute reason code when the confidence score satisfies a threshold. In some embodiments, determining the dispute resolution comprises processing the dispute resolution to remove the dispute from further processing, thereby conserving computing resources. In some embodiments, the threshold can be a numeric value such as a percentage (e.g., greater than 75%). In some embodiments, the dispute resolution information is transmitted for manual review when the confidence score (e.g., class prediction probability score 710 (FIG. 7)) does not satisfy the threshold.

In many embodiments, method 400 can comprise an activity of training the machine learning engine 500 (FIG. 5) on dispute resolution information. In some embodiments, training the machine learning engine 500 (FIG. 5) comprises individually training each of the first machine learning module 508 (FIG. 5), the second machine learning module 512 (FIG. 5), the third machine learning module 516 (FIG. 5), and the fourth machine learning module 520 (FIG. 5). That is, each of the machine learning modules are trained individually based on their corresponding dispute reason codes to conserve computing resources and mitigate having to train the entire machine learning engine 500 (FIG. 5) when new training data is available. For example, updated training data may be available for "DISPUTE_REASON_1_1" (FIG. 6). As such, only the second machine learning module 512 (FIG. 5) needs to be trained without interruption to the operation of the machine learning engine 500 (FIG. 5).

Returning to FIG. 5, in some embodiments, training a machine learning algorithm (e.g., each of the first machine learning module 508, the second machine learning module 512, the third machine learning module 516, and the fourth machine learning module 520) can comprise estimating internal parameters of a model configured to identify a dispute resolution. In various embodiments, a machine learning algorithm can be trained using labeled training data, otherwise known as a training dataset. In many embodiments, a training dataset can comprise verified dispute resolutions corresponding to particular reason codes. In this way, a machine learning algorithm can be configured to identify the probable reason code and corresponding dispute resolution. In the same or different embodiments, a pre-trained machine learning algorithm can be used, and the pre-trained algorithm can be re-trained on the labeled training data. In some embodiments, the machine learning model can also consider both historical and dynamic input from a training data source such as manually verified dispute resolution information. In this way, a machine learning algorithm can be trained iteratively as data from the training data source is added to a training data set. In many embodiments, a machine learning algorithm can be iteratively trained in real time as data is added to a training data set. In various embodiments, a machine learning algorithm can be trained, at least in part, on a single user's (e.g., user 350 (FIG. 3)) dispute resolution information or the single user's dispute resolution information can be weighted in a training data set. In this way, a machine learning algorithm tailored to a single user can be generated. In the same or different embodiments, a machine learning algorithm tailored to a single user can be used as a pre-trained algorithm for a similar user. In several embodiments, due to a large amount of data needed to create and maintain a training data set, a machine learning model can use extensive data inputs. Due to these extensive data inputs, in many embodiments, creating, training, and/or using a machine learning algorithm configured to resolve disputes cannot practically be performed in a mind of a human being.

Figure 8:
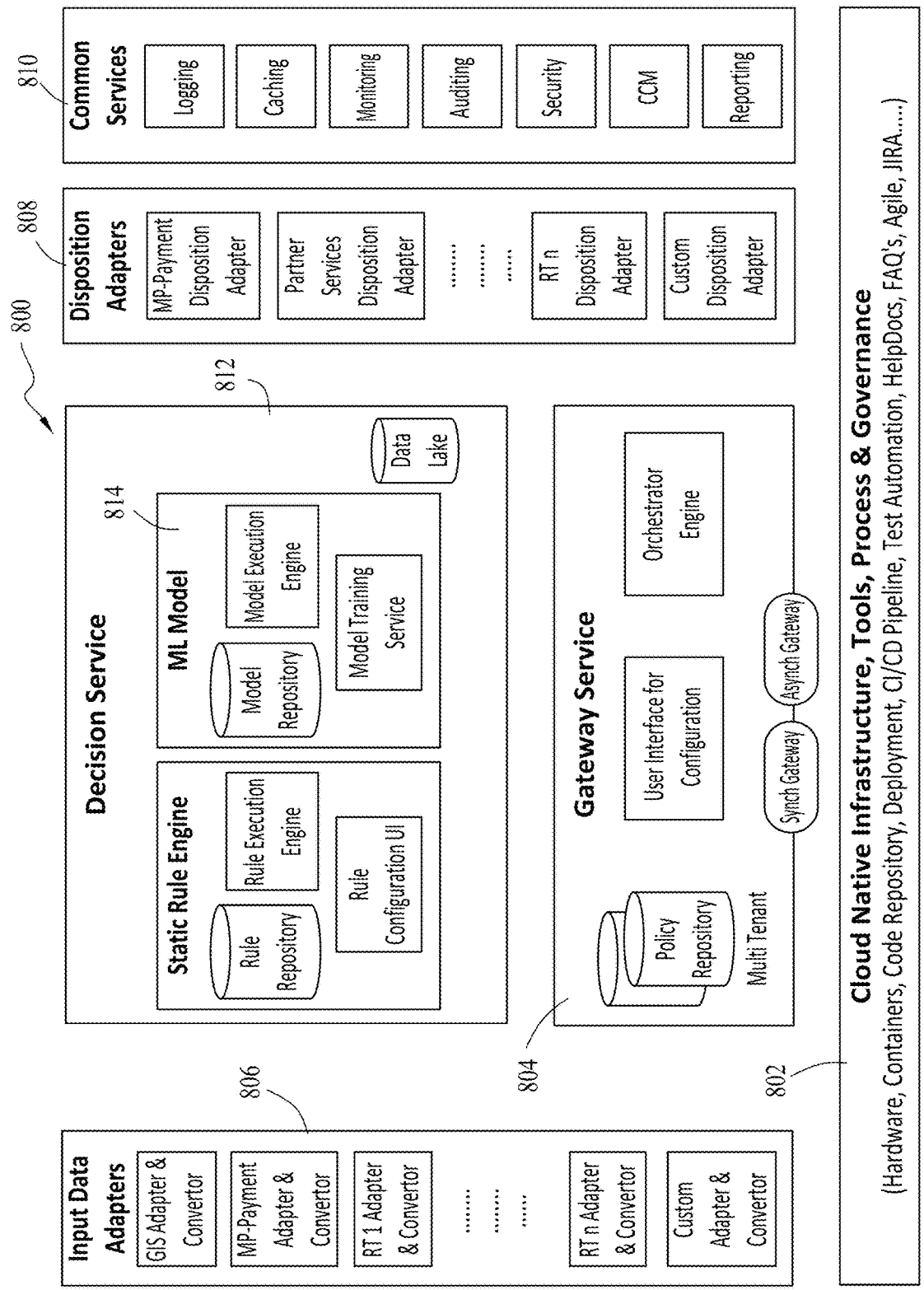
FIG. 8 illustrates an exemplary system architecture, according to certain embodiments.

Turning to FIG. 8, an exemplary system architecture 800 is illustrated according to certain embodiments. In some embodiments, the system architecture 800 can be utilized with embodiments disclosed herein. In some embodiments, the system architecture 800 can be utilized with method 400 (FIG. 4). In the illustrated embodiment, the system architecture 800 includes a cloud infrastructure 802, a gateway service 804, input data adapters 806, disposition adapters 808, common services 810, and a decision service 812.

In some embodiments, the gateway service 804 can comprise a policy repository, a user interface for configuration, an orchestrator engine, a synch gateway, and/or an asynch gateway.

In some embodiments, the input data adapters 806 can comprise global information system (GIS) adapter and convertor, MarketPlace (MP)-Payment adapter and convertor, one or more resource tiers (RT) adapters and convertors, and/or a custom adapter and convertor.

In some embodiments, the disposition adapters 808 can comprise MP-payment disposition adapter, partner services disposition adapter, one or more RT disposition adapters, and/or a custom disposition adapter.

In some embodiments, common services 810 can comprises logging, caching, monitoring, auditing, security, cloud configuration management (CCM), and/or reporting.

In some embodiments, the decision service 812 can comprise a static rule engine, a data lake, and/or a machine learning engine. In some embodiments, the decision service 812 comprises a machine learning (ML) model 814. In some embodiments, the ML model 814 is the machine learning engine 500 (FIG. 5), and/or can include a model repository, a model execution service, and/or a model training service. The static rule engine of decision service 812 can include a rule repository, a rule execution engine and/or a rule configuration user interface.

Returning to FIG. 3, in several embodiments, communication system 311 can at least partially perform activity 410 (FIG. 4).

In several embodiments, evaluation system 312 can at least partially perform activity 420 (FIG. 4), and/or activity 430 (FIG. 4).

In a number of embodiments, resolution system 313 can at least partially perform activity 440 (FIG. 4).

In a number of embodiments, web server 320 can at least partially perform method 400.

Although systems and methods for dispute resolution have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors;
   a dispute resolution system, wherein the dispute resolution system includes a machine learning engine that comprises a plurality of machine learning modules, and wherein the plurality of machine learning modules corresponds to a plurality of respective tiers; and
   one or more non-transitory computer-readable media storing computing instructions that, when executed on the one or more processors, cause the dispute resolution system to perform:
   receiving dispute resolution information from a user corresponding to a dispute, wherein the dispute resolution information comprises a first data input and a second data input;
   analyzing, with a first machine learning module in a first tier of the machine learning engine, the dispute resolution information from the user to identify a dispute reason, wherein the first tier corresponds to a first level of dispute reasons and the first machine learning module is trained to analyze the first level of dispute reasons to identify the dispute reason within the first level of dispute reasons;
   analyzing, with at least one of second and third machine learning modules in a second tier of the machine learning engine, the dispute resolution information based on the dispute reason, as identified, wherein the second tier corresponds to a second level of dispute reasons each related to a respective dispute reason in the first level of dispute reasons and the at least one of the second and third machine learning modules is trained to analyze the second level of dispute reasons to identify the dispute reason within the second level of dispute reasons;
   determining a dispute resolution based on an output of the second tier of the machine learning engine to resolve the dispute;
   training the machine learning engine on the dispute resolution information, wherein the training of the machine learning engine comprises individually training each of the first machine learning module, the second machine learning module, and the third machine learning module based on corresponding dispute reason codes using partial computing resources of the machine learning engine; and
   based on the determined dispute resolution, executing one or more dispute resolution actions, wherein the one or more dispute resolution actions include at least one of outputting a dispute reason code, replacing a dispute reason code submitted by the user, and processing the dispute resolution to remove the dispute from further processing.

2. The system of claim 1, wherein the first machine learning module is a Bidirectional Encoder Representations from Transformers (BERT) transformer.

3. The system of claim 2, wherein an operation of the BERT transformer comprises:
   receiving the dispute resolution information;
   tokenizing the second data input of the dispute resolution information into one or more tokens, wherein the tokens correspond to a portion of the second data input; and
   determining one or more embeddings for the one or more tokens.

4. The system of claim 3, wherein the BERT transformer comprises a pooling layer and a dropout layer subsequent to determining the one or more embeddings.

5. The system of claim 1, wherein the machine learning engine comprises:
   the first machine learning module trained to analyze the first level of dispute reasons;
   the second machine learning module trained to analyze the second level of a first portion of the first level of dispute reasons;
   the third machine learning module trained to analyze the second level of a second portion of the first level of dispute reasons; and
   a third tier comprising a fourth machine learning module, wherein the fourth machine learning module is trained to analyze a third level of a portion of the first level of dispute reasons.

6. The system of claim 1, wherein:
   the first data input corresponds to a dispute reason code selected by the user from a predefined list of dispute reason codes; and
   the second data input corresponds to a natural language text description input by the user.

7. The system of claim 6, wherein an output of the machine learning engine is a predicted dispute reason code and a confidence score, wherein the predicted dispute reason code is used to replace the dispute reason code selected by the user.

8. The system of claim 7, wherein determining the dispute resolution comprises:
   replacing the dispute reason code selected by the user with the predicted dispute reason code when the confidence score satisfies a threshold; and
   processing the dispute resolution to remove the dispute from further processing.

9. The system of claim 8, further comprising transmitting the dispute resolution information for manual review when the confidence score does not satisfy the threshold.

10. The system of claim 1, wherein analyzing, with at least one of the second and third machine learning modules in the second tier of the machine learning engine, the dispute resolution information further comprises analyzing, with the second machine learning module and not the third machine learning module, the dispute resolution information based on the dispute reason, as identified.

11. A method implemented via execution of computing instructions configured to run at one or more processors and configured to be stored at non-transitory computer-readable media, the method comprising:
    using a machine learning engine comprised of a plurality of machine learning modules that correspond to a plurality of respective tiers to perform:

receiving dispute resolution information from a user corresponding to a dispute, wherein the dispute resolution information comprises a first data input and a second data input;

analyzing, with a first machine learning module in a first tier of the machine learning engine, the dispute resolution information from the user to identify a dispute reason, wherein the first tier corresponds to a first level of dispute reasons and the first machine learning module is trained to analyze the first level of dispute reasons to identify the dispute reason within the first level of dispute reasons;

analyzing, with at least one of second and third machine learning modules in a second tier of the machine learning engine, the dispute resolution information based on the dispute reason, as identified, wherein the second tier corresponds to a second level of dispute reasons each related to a respective dispute reason in the first level of dispute reasons and the at least one of the second and third machine learning modules is trained to analyze the second level of dispute reasons to identify the dispute reason within the second level of dispute reasons; and determining a dispute resolution based on an output of the second tier of the machine learning engine to resolve the dispute;

training the machine learning engine on the dispute resolution information, wherein the training of the machine learning engine comprises individually training each of the first machine learning module, the second machine learning module, and the third machine learning module based on corresponding dispute reason codes using partial computing resources of the machine learning engine; and based on the determined dispute resolution, executing one or more dispute resolution actions, wherein the one or more dispute resolution actions include at least one of outputting a dispute reason code, replacing a dispute reason code submitted by the user, and processing the dispute resolution to remove the dispute from further processing.

12. The method of claim 11, wherein the first machine learning module is a Bidirectional Encoder Representations from Transformers (BERT) transformer.

13. The method of claim 12, wherein an operation of the BERT transformer comprises:
receiving the dispute resolution information;
tokenizing the second data input of the dispute resolution information into one or more tokens, wherein the tokens correspond to a portion of the second data input; and
determining one or more embeddings for the one or more tokens.

14. The method of claim 13, wherein the BERT transformer comprises a pooling layer and a dropout layer subsequent to determining the one or more embeddings.

15. The method of claim 11, wherein the machine learning engine comprises:
the first machine learning module trained to analyze the first level of dispute reasons;
the second machine learning module trained to analyze the second level of a first portion of the first level of dispute reasons;
the third machine learning module trained to analyze the second level of a second portion of the first level of dispute reasons; and a third tier comprising a fourth machine learning module, wherein the fourth machine learning module is trained to analyze a third level of a portion of the first level of dispute reasons.

16. The method of claim 11, wherein:
the first data input corresponds to a dispute reason code selected by the user from a predefined list of dispute reason codes; and
the second data input corresponds to a natural language text description input by the user.

17. The method of claim 16, wherein an output of the machine learning engine is a predicted dispute reason code and a confidence score, wherein the predicted dispute reason code is used to replace the dispute reason code selected by the user.

18. The method of claim 17, wherein determining the dispute resolution comprises:
replacing the dispute reason code selected by the user with the predicted dispute reason code when the confidence score satisfies a threshold;
processing the dispute resolution to remove the dispute from further processing; and transmitting the dispute resolution information for manual review when the confidence score does not satisfy the threshold.

19. The method of claim 11, wherein analyzing, with at least one of the second and third machine learning modules in the second tier of the machine learning engine, the dispute resolution information further comprises analyzing, with the second machine learning module and not the third machine learning module, the dispute resolution information based on the dispute reason, as identified.

20. A non-transitory computer-readable medium storing instructions that upon execution by a processor, cause the processor to perform operations including a computer-implemented method, the computer-implemented method comprising:
using a machine learning engine comprised of a plurality of machine learning modules that correspond to a plurality of respective tiers to perform:
receiving dispute resolution information from a user corresponding to a dispute, wherein the dispute resolution information comprises a first data input and a second data input;
analyzing, with a first machine learning module in a first tier of the machine learning engine, the dispute resolution information from the user to identify a dispute reason, wherein the first tier corresponds to a first level of dispute reasons and the first machine learning module is trained to analyze the first level of dispute reasons to identify the dispute reason within the first level of dispute reasons;
analyzing, with at least one of second and third machine learning modules in a second tier of the machine learning engine, the dispute resolution information based on the dispute reason, as identified, wherein the second tier corresponds to a second level of dispute reasons each related to a respective dispute reason in the first level of dispute reasons and the at least one of the second and third machine learning modules is trained to analyze the second level of dispute reasons to identify the dispute reason within the second level of dispute reasons; and
determining a dispute resolution based on an output of the second tier of the machine learning engine to resolve the dispute;
training the machine learning engine on the dispute resolution information, wherein the training of the machine learning engine comprises individually training each of the first machine learning module, the second machine learning module, and the third machine learning module based on corresponding dispute reason codes using partial computing resources of the machine learning engine; and based on the determined dispute resolution, executing one or more dispute resolution actions, wherein the one or more dispute resolution actions include at least one of outputting a dispute reason code, replacing a dispute reason code submitted by the user, and processing the dispute resolution to remove the dispute from further processing.

* * * * *